United States Patent [19]

Horton

[11] 4,293,112

[45] Oct. 6, 1981

[54] COMPACT MIRROR MOUNT

[75] Inventor: James A. Horton, Kennewick, Wash.

[73] Assignee: Jersey Nuclear-Avco Isotopes, Inc., Bellevue, Wash.

[21] Appl. No.: 89,160

[22] Filed: Oct. 29, 1979

[51] Int. Cl.³ .............................................. G02B 7/18
[52] U.S. Cl. ..................................... 248/487; 350/288
[58] Field of Search .............. 350/288, 310, 285, 289; 248/481, 487; 74/471 XY, 501 M

[56] References Cited

U.S. PATENT DOCUMENTS

| | | | |
|---|---|---|---|
| 3,352,524 | 11/1967 | Rossi | 248/481 |
| 3,368,781 | 2/1968 | Altoz | 248/481 |
| 3,527,534 | 9/1970 | Giacomo et al. | 350/299 |
| 3,566,302 | 2/1971 | Rhodes | 350/288 |
| 3,588,025 | 6/1971 | Gersman | 350/288 |
| 3,596,863 | 8/1971 | Kaspareck | 350/288 |
| 3,814,365 | 6/1974 | Mackenzie | 350/288 |

OTHER PUBLICATIONS

P. W. Pace et al., "Simple . . . Mirror Mount" 47 *Rev. Sci. Instrum.*, No. 9, pp. 1215–1216, Sep. 1976.

*Primary Examiner*—Jon W. Henry
*Attorney, Agent, or Firm*—Weingarten, Schurgin & Gagnebin

[57] ABSTRACT

Apparatus for mounting and aligning an optical element on a support structure comprises pivot means for mounting the element so that it can rotate about axes in two orthogonal directions and a pair of alignment means, each comprising a plunger and an inclined guide groove, for rotating the element about the two respective axes. Adjustment means, such as threaded screws, are provided for urging the plunger along the inclined grooves. The grooves are inclined at a sufficiently small angle to permit precision alignment. In order to reduce temperature sensitivity, the path of plunger motion is directed towards the pivotal centers and axes of the mount, and the optical element is placed on the axis between the pivot and the plunger.

7 Claims, 7 Drawing Figures

COMPACT MIRROR MOUNT

FIELD OF THE INVENTION

This invention relates to apparatus for mounting and aligning optical devices and, in particular, to such apparatus especially useful as a compact mirror mount having reduced temperature sensitivity.

BACKGROUND OF THE INVENTION

Mechanisms for mounting and aligning optical units, such as mirrors or filters are essential in many optical systems, including those employing laser beams. Typically, in order to properly align the optical element with respect to the optical axis of the system, the mechanisms must be capable of precise adjustment around axes in two orthogonal directions.

While a wide variety of mounting arrangements have been developed, many are too temperature sensitive for use in optical systems employing high intensity laser beams. Temperature differentials arising, for example, from absorption of laser radiation within the optical element, can produce differential thermal expansion within the mounting apparatus and destroy precise alignment.

Some optical systems, such as those used for laser enrichment of uranium, not only utilize high intensity laser beams but also require a high density of optical components. Such systems typically need extremely long folded paths of high intensity laser beams and a multiplicity of compact, temperature insensitive mirror mounts for precisely directing the beams back and forth through an enrichment chamber. The mounts must be individually removable and sufficiently compact that many mirrors can be mounted adjacent one another in a small area.

SUMMARY OF THE INVENTION

In accordance with the present invention, apparatus for mounting and aligning an optical element on a support structure comprises pivot means for mounting the element so that it can rotate about axes in two orthogonal directions and a pair of alignment means, each comprising a plunger and an inclined guide groove, for rotating the element about the two respective axes. Adjustment means, such as threaded screws, are provided for urging the plunger along the inclined grooves. The grooves are inclined at a sufficiently small angle to permit precision alignment. In order to reduce temperature sensitivity, the path of plunger motion is directed towards the pivotal centers and axes of the mount, and the optical element is placed on the axis between the pivot and the plunger.

BRIEF DESCRIPTION OF THE DRAWINGS

The nature, advantages and various additional features of the invention are more fully set forth below in the description of the accompanying drawings.

In the drawings.

For convenience of reference, the same structural elements are given the same reference numerals throughout the drawings.

DETAILED DESCRIPTION OF THE DRAWINGS

Figure 1:
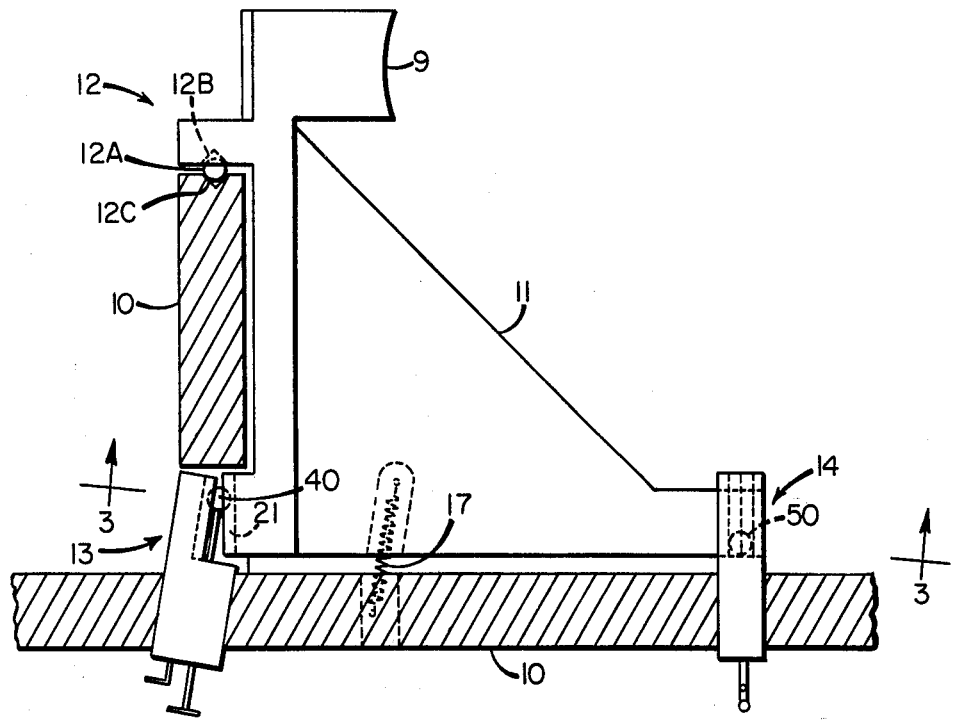
FIG. 1 is a schematic side view of a preferred mounting and aligning arrangement in accordance with the invention.
Figure 2:
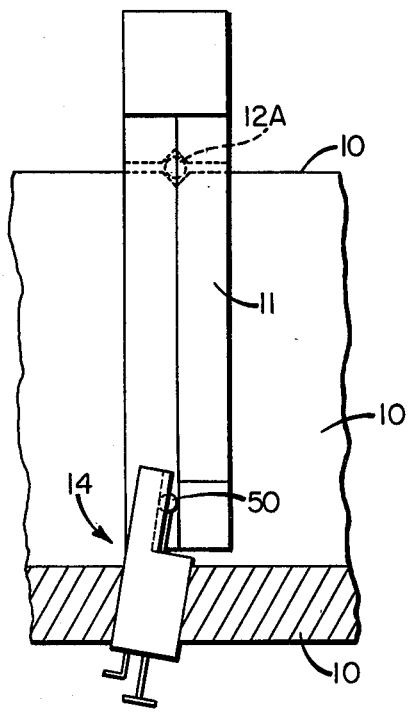
FIG. 2 is a front view of the arrangement of FIG. 1.
Figure 3:
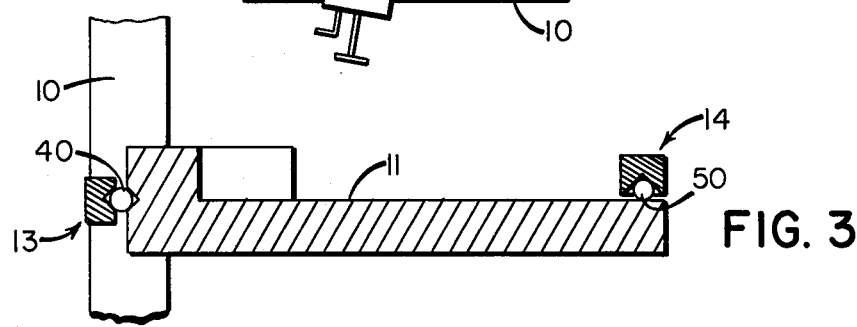
FIG. 3 is a cross-sectional bottom view along the line DD' of the arrangement of FIG. 1.

Referring to the drawings, FIGS. 1, 2 and 3 show preferred apparatus for mounting and aligning on a right angle frame 10, an optical element 9, such as a multilayer dielectric coated mirror fastened to a generally triangular support member 11. A pivotal mount 12, is provided between the support member 11 and frame 10 by a spherical ball 12A and a pair of conical receiving sockets 12B and 12C formed in member 11 and frame 10, respectively. Ball 12A mounts the member 11 onto frame 10 in such a manner that it can rotate about a vertical axis therethrough and about a horizontal axis which lies orthogonal to the sheet.

A pair of alignment mechanisms 13 and 14 are provided for adjustably rotating the optical member 11 about pivotal mounting 12 about these two axis. Mechanisms 13 and 14 project through frame 10 at acute angles to permit rotation of the member 11.

Figure 4A:
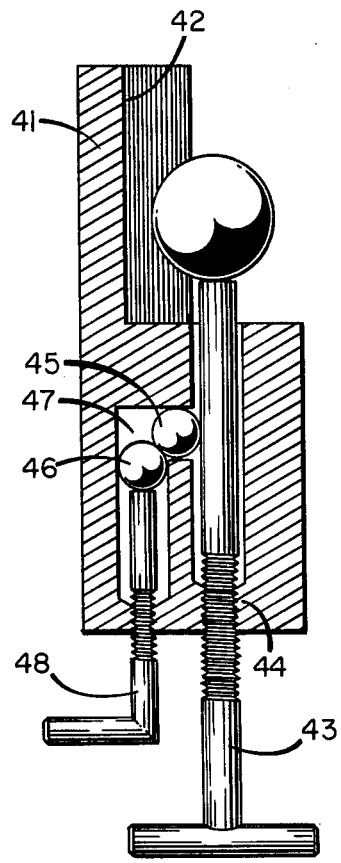
FIGS. 4A and 4B are enlarged cross-sectional and top views, respectively, of the ball and inclined guide grooves used in the embodiment of FIG. 1.
Figure 4B:
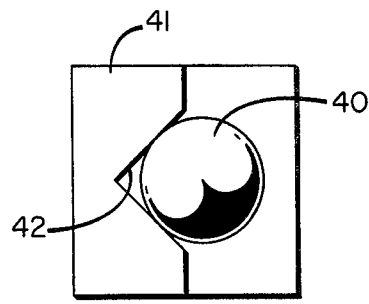

As better shown in FIGS. 4A and 4B, alignment mechanisms 13 and 14 each comprise a spherical ball 40 and a grooved guiding member 41 with an inclined guiding groove 42 for cradeling the ball against the optical member 11. In alignment mechanisms 13, the member 11 is provided with a similar groove 21 whereas in mechanism 14 the member 11 is flat. A knobbed threaded rod 43 and a complementary threaded housing 44 are provided for moving the ball 40 along the guide groove 42 in a generally vertical direction. The ball and threaded rod effectively form a plunger for moving between the two mutually inclined planes.

Conveniently the alignment mechanism 13 is also provided with a locking mechanism for holding the optical device in position once proper alignment has been obtained. A preferred locking mechanism, shown in FIG. 4A, comprises a pair of balls 45 and 46. These balls can be forced through passage 47 by threaded locking rod 48 into locking engagement with threaded rod 43.

The angles between the vertices of the grooves 42 and 21, provided by the off-vertical orientation of mechanism 13 forces rotation of member 11 as the ball 40 is urged up and down.

Alignment mechanism 14 operates in substantially the same manner as mechanism 13 except that mechanism 14 is oriented for rotating the optical member 11 about a vertical axis. To accomplish this result with minimal temperature sensitivity, the guiding groove, threaded rod, and housing are preferably all aligned so that the surface in contact with member 11 of the spherical ball 50 moves in the same plane as contains the centers of balls 12A and 40.

Advantageously, optical member 11 is spring biased, as by spring 17 of FIG. 1, to return in an equilibrium position in the absence of force on balls 40 and 50. Balls 40 and 50 are also preferably return biased against their respective threaded adjustment rods by additional springs (not shown).

In operation, the optical device is installed as illustrated and precisely aligned by rotation of the threaded rods. In a typical instance of a 6 inch separation between ball 40 and pivotal ball 12A and a 1:10 slope on the guide member, a 10% rotation of the threaded rod would rotate the optical element 9 by about one second of arc. Because the guide grooves and the adjustment ball motions are all directed toward the pivot point, differential expansion between the optical device and the frame has a minimal effect on alignment about the horizontal dimension, which is the dimension most critical for guiding laser beams in laser enrichment.

Figure 5A:
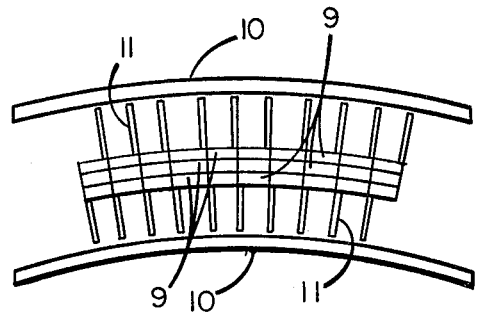
FIGS. 5A and 5B are front and side views, respectively, of a compact array of optical elements individually mounted and aligned in accordance with the invention.
Figure 5B:
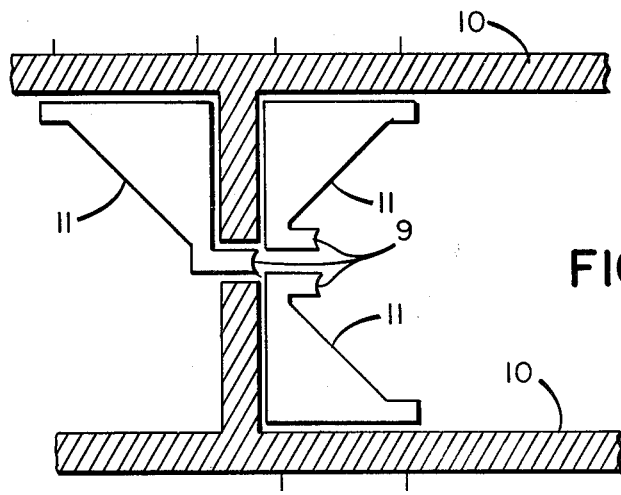

FIGS. 5A and 5B are front and side views respectively of an array of optical members 11 each having a reflecting surface 9 mounted on a common frame 10 in the manner described hereinabove. As can be seen, the compactness of the mounting and aligning arrangement is highly useful in permitting the formation of closely stacked arrays of individually alignable and removable optical members and the mirror elements they carry.

While the invention has been described in connection with but a small number of specific embodiments, it is to be understood that these are merely illustrative of the many other specific embodiments which can also utilize the principles of the invention.

What is claimed is:

1. Apparatus for mounting and aligning an optical member on a support structure comprising:
   means for pivotally mounting such optical member onto such support structure in such a manner than the member can pivot about axes in two substantially orthogonal directions;
   first alignment means for pivoting said member about a first of said axes comprising (a) first and second surfaces on said member and said support structure, respectively, said surfaces being inclined to each other and being oriented for guiding said plunger means generally along a line through said pivotal mounting, and (b) first plunger means for moving between said surfaces thereby to rotate said member; and
   second alignment means for pivoting said member about the second of said axes.

2. Apparatus for mounting and aligning an optical member on a support structure comprising:
   means for pivotally mounting such optical member onto such support structure in such a manner that the member can pivot about axes in two substantially orthogonal directions;
   first alignment means for pivoting said member about a first of said axes comprising (a) first and second surfaces on said member and said support structure respectively, said surfaces being inclined to each other, and (b) plunger means for moving between and along said surfaces thereby to rotate said member; and
   second alignment means comprising (a) third and fourth surfaces on said member and said support structure, respectively, said surfaces being inclined to each other, and (b) second plunger means for moving between and along said surfaces thereby to rotate said member.

3. Apparatus according to claim 1 or 2 wherein said first and second surfaces comprise grooves, and at least said first plunger means comprises a substantially spherical ball.

4. Apparatus according to claim 2 wherein:
   said first and second surfaces of said first alignment means are oriented for guiding said first plunger generally in alignment with said pivotal mounting; and
   said third and fourth surfaces of said second alignment means are oriented for guiding said second plunger generally in a plane containing said pivotal mounting.

5. Apparatus according to claim 1, 2 or 4 wherein said pivotal mounting means comprises a ball-and-socket mounting.

6. Apparatus according to claim 1, 2 or 4 wherein the optical member comprises reflecting means.

7. Apparatus according to claim 1, 2 or 4 further comprising locking means for locking said optical device in position.

* * * * *